United States Patent [19]
Beard

[11] Patent Number: 5,747,938
[45] Date of Patent: May 5, 1998

[54] AUTOMATIC CONTROL ELECTROLUMINESCENT BACKLIGHT PANEL

[75] Inventor: Paul Beard, Milpitas, Calif.

[73] Assignee: Norand Corporation, Cedar Rapids, Iowa

[21] Appl. No.: 445,494

[22] Filed: May 22, 1995

Related U.S. Application Data

[63] Continuation-in-part of Ser. No. 324,648, Oct. 18, 1994, Pat. No. 5,568,016.

[51] Int. Cl.$^6$ ........................................... G09G 3/10
[52] U.S. Cl. .................. 315/169.3; 315/155; 315/291; 315/307
[58] Field of Search ................... 315/169.3, 209 R, 315/226, 239, 307, 169.4, 200 R, 205, 219, 224, 169.1, 155, 291; 340/468, 461, 462, 815.01; 345/63, 102, 207

[56] References Cited

U.S. PATENT DOCUMENTS

| | | | |
|---|---|---|---|
| 3,761,617 | 9/1973 | Tsuchiya et al. | 315/169.3 X |
| 3,882,357 | 5/1975 | Nieuweboer et al. | 315/209 R |
| 4,527,096 | 7/1985 | Kindlmann | 315/169.3 |
| 4,760,389 | 7/1988 | Aoki et al. | 345/207 X |
| 4,859,912 | 8/1989 | Lippmann et al. | 315/169.3 |
| 4,868,563 | 9/1989 | Stair et al. | 340/825.44 |
| 4,952,848 | 8/1990 | Erhardt | 315/307 |
| 4,954,752 | 9/1990 | Young et al. | 315/169.3 |
| 4,982,141 | 1/1991 | Pace et al. | 315/169.3 |
| 5,027,040 | 6/1991 | Ikeda et al. | 315/241 R |
| 5,066,895 | 11/1991 | Alessio | 315/226 |
| 5,105,179 | 4/1992 | Smith | 340/468 |
| 5,144,203 | 9/1992 | Fujita et al. | 315/169.3 |
| 5,227,696 | 7/1993 | Asars | 315/169.3 |
| 5,313,141 | 5/1994 | Kimball | 315/169.3 |
| 5,313,188 | 5/1994 | Choi et al. | 315/200 A X |
| 5,323,305 | 6/1994 | Ikeda et al. | 315/169.3 X |
| 5,336,978 | 8/1994 | Alessio | 315/169.3 |
| 5,345,146 | 9/1994 | Koenck et al. | 315/169.3 |
| 5,440,208 | 8/1995 | Uskali et al. | 315/169.3 |
| 5,568,016 | 10/1996 | Beard | 315/169.3 |
| 5,576,601 | 11/1996 | Koenck et al. | 315/169.3 |

Primary Examiner—Robert Pascal
Assistant Examiner—Haissa Philogene
Attorney, Agent, or Firm—Suiter & Associates PC; Kenneth J. Cool

[57] ABSTRACT

An electroluminescent backlight panel for a video display system is automatically controlled by the varying ambient light levels. A light detector receives the ambient light level and sends a corresponding electrical signal to a microcontroller. The microcontroller controls the driving of the eletroluminescent backlight power supply according to varying ambient light levels until an optimum backlight output is reached. The automatic electroluminescent backlight control system is combined with an efficient power supply unit in order to further reduce battery energy consumption.

12 Claims, 3 Drawing Sheets

AUTOMATIC CONTROL ELECTROLUMINESCENT BACKLIGHT PANEL

CROSS-REFERENCE TO RELATED APPLICATION

The present invention is a continuation-in-part of U.S. application Ser. No. 08/324,648 filed Oct. 18, 1994, now U.S. Pat. No. 5,568,016. Said application Ser. No. 08/324,648 is hereby incorporated herein in its entirety.

TECHNICAL FIELD

The present invention relates generally to electroluminescent backlight devices used in liquid-crystal display systems and particularly to automatic control of the electroluminescent panel of a liquid-crystal display system.

BACKGROUND OF THE INVENTION

The video display systems of portable electronic equipment and computer data terminals commonly employ liquid-crystal displays. Liquid-crystal displays often require some form of backlighting in order for the video display to have functional brightness and visibility. The backlighting of liquid-crystal displays frequently implement electroluminescent panels (EL panels) to provide the necessary light intensity. Electroluminescent backlight panels are composed of an electroluminescent material that emits visible light when driven with an alternating current.

In portable battery powered electronic equipment and computer data terminals, conservation of battery energy is an important design criterion. Electroluminescent backlight panels operate at high voltages and consume a large if not the largest portion of the onboard available battery power. Therefore, an optimized electroluminescent backlight circuit design is a crucial first step toward maximizing battery life in portable electronic devices.

Liquid-crystal displays require electroluminescent panel backlighting to illuminate the display because ambient light levels typically provide insufficient illumination. However, ambient light levels in the area in which the portable electronic device (having a liquid-crystal display) is utilized may be continually fluctuating from little or no light within the interior of a building to bright outdoor sunlight. Conventionally, the intensity of the light emitted from the electroluminescent backlight is either fixed or adjusted by the operator by manipulation of a potentiometer which controls the drive signal to the EL panel. Conventional fixed level EL panels may provide more or less light than necessary in varying ambient light levels and thereby waste battery energy. With conventional user adjustable EL panels, the user may not set the EL panel to the optimum light level, and even so, the user must continually adjust the EL panel drive level as ambient light levels fluctuate. Thus, there exists a need for an electroluminescent LCD backlight panel which automatically adjusts the light output to an optimum level in accordance with varying ambient lighting conditions.

SUMMARY OF THE INVENTION

The invention provides automatic control of the light output of an electroluminescent backlight according to varying ambient light levels.

In a preferred version of the invention the light output of an electroluminescent backlight is automatically controlled according to varying ambient light levels and the output of the electroluminescent backlight. Automatic control of the electroluminescent backlight output may be combined with an efficient power supply unit to further increase the operating efficiency.

Therefore, the principle features of the present invention include an electroluminescent backlight, a power supply unit, a plurality of light detectors and a control system for controlling the electroluminescent backlight output level.

Other principle objects, features and advantages of the invention will become apparent from the following description and accompanying drawings, which set forth by way of illustration and example certain specific embodiments of this invention.

DESCRIPTION OF AN EXEMPLARY EMBODIMENT

Figure 1:
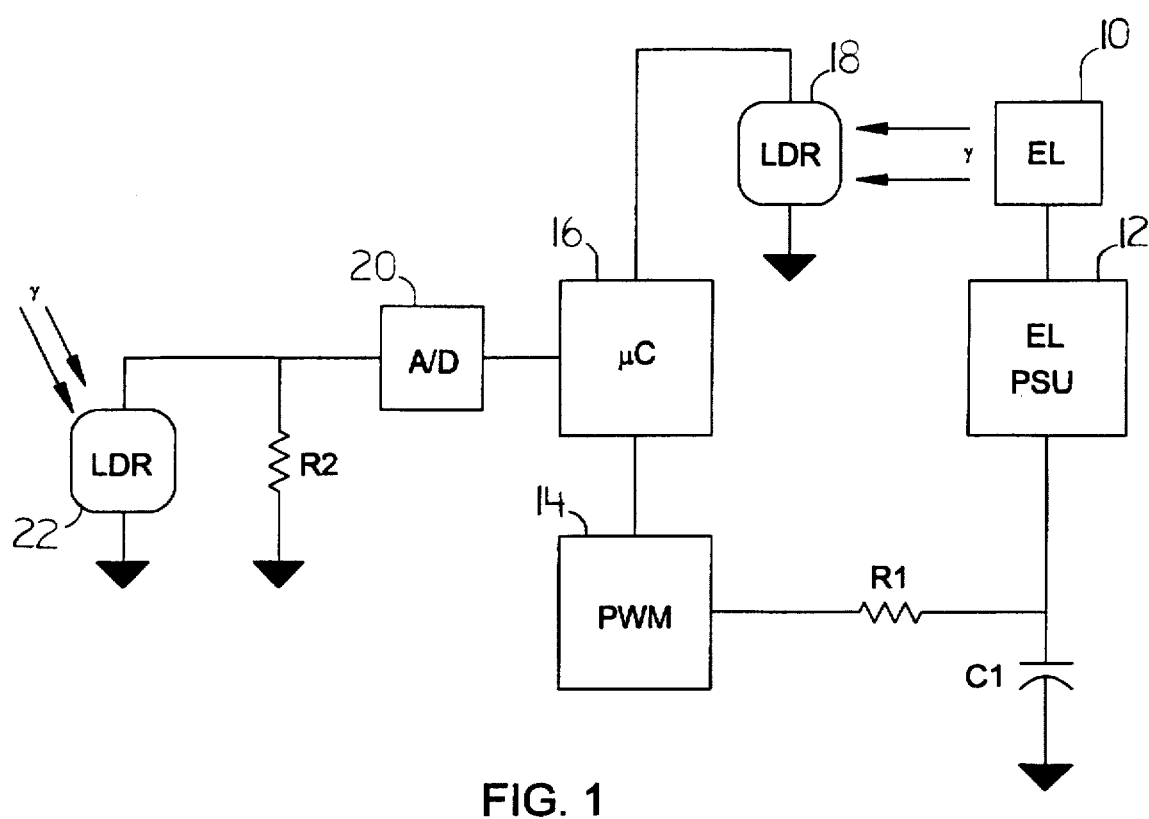
FIG. 1 is a schematic illustration of an automatically adjustable electroluminescent backlight panel in accordance with the present invention.

FIG. 1 schematically illustrates an exemplary automatic control circuitry for an electroluminescent panel which may be utilized as a backlight in a liquid-crystal display system. An electroluminescent panel (EL) 10 is of the standard variety which is driven by an electroluminescent panel power supply unit (EL PSU) 12. The power supply unit 12 provides an alternating-current to drive the electroluminescent panel 10 which may range from 50 Hz to 1 kHz in frequency and from 75 Vrms to 200 Vrms depending on the requirements of the panel 10, for example. Because portable electronic devices are typically powered by a battery providing a direct-current voltage on the order of 10 volts, the power supply unit 12 may be a specialized circuit which is capable of providing a high voltage alternating-current from a low voltage direct-current source.

The power supply unit 12 is provided with a driving signal from a pulse-width modulator (PWM) 14 which controls the driving of the electroluminescent panel 10. The pulse duration of the pulse-width modulator output signal may be intelligently controlled by a microcontroller (μC) 16 which may be the microprocessor of the portable electronic device in which the present invention is utilized. Alternatively, the microcontroller 16 may be a digital signal coprocessor dedicated to control of the peripheral devices in a portable electronic device such as the input and output devices. The output signal of the pulse-width modulator 14 may connect through a filter network comprising R1 and C1 before reaching the input of the power supply unit 12 to smooth the output current of the pulse-width modulator 14.

The microcontroller 16 receives an input signal from a light detector (LDR) 18 located in proximity to the electroluminescent panel 10. The light detector 18 responsively senses the light emitted from the electroluminescent panel 10 such that EL panel light intensity information is received and monitored by the microcontroller 10. The microcontroller 16 also receives an input signal from an analog-to-digital convertor (A/D) 20. The A/D convertor 20 receives an input signal from another light detector 22 which is positioned to receive and sense ambient light levels. A resistor R2 may be connected at the input of the A/D convertor 20 to provide the correct input resistance. Light detectors 18 and 22 may be a suitable electrical element which is electrically responsive to the impingement of photons thereupon such as a photodiode, a phototransistor, a photoresistor or the like.

The microcontroller 16 receives the light level information from the ambient light detector 22 and the EL panel light detector 18 and may adjust the drive to the power supply unit 12 through control of the pulse-width modulator 14 with a predetermined algorithm until the light output of the EL panel 10 is at an optimum level. The monitoring of the light levels and corresponding adjustment of the light output may be a continual process which requires no intervention or control by the operator.

Figure 2:
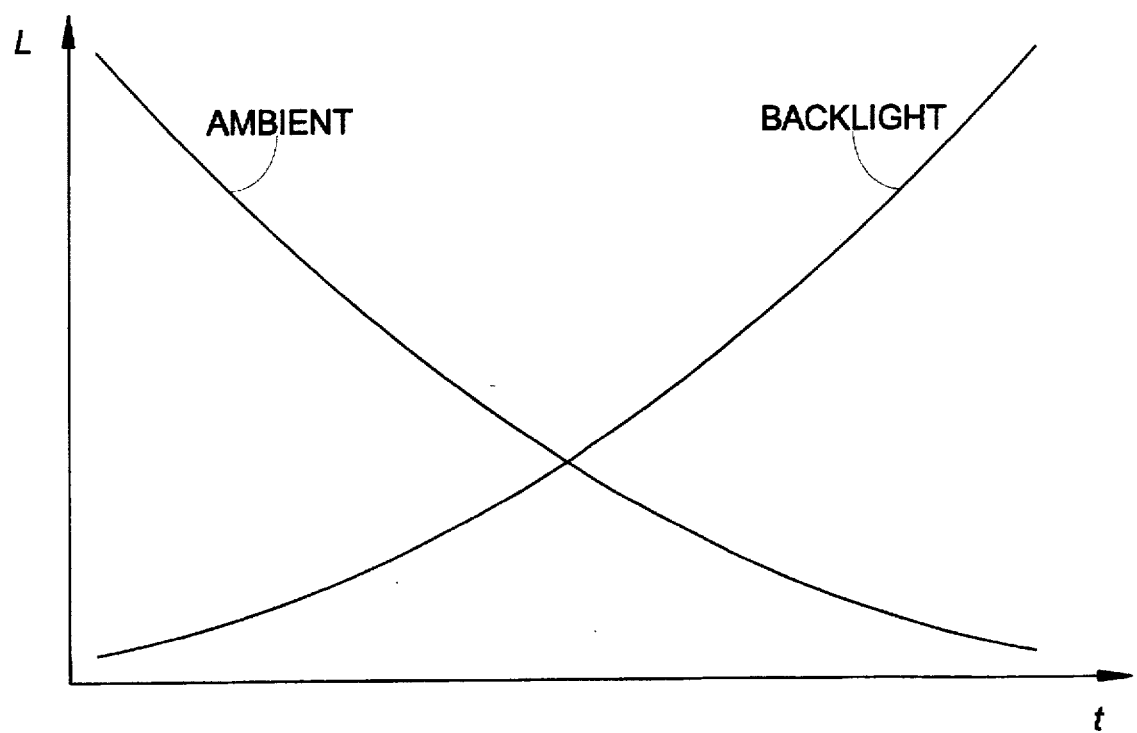
FIG. 2 illustrates the variation of the backlight levels of an EL panel in response to changing light levels in accordance with the present invention.

FIG. 2 is an illustration of the automatic adjustment of the output of an electroluminescent backlight panel in response to varying ambient light levels in accordance with the present invention. The ordinate axis L represents relative light intensity and the abscissal axis t represents time. The relative light intensity of the ambient light (AMBIENT) is plotted and shown to be generally decreasing over time. At an earlier time when ambient light levels are high, the light output intensity of the EL panel backlight (BACKLIGHT) is relatively low in comparison to the ambient light level. At that time ambient light levels are sufficient to illuminate the liquid-crystal display, therefore less light output from the EL panel is required and used thereby conserving battery energy.

As the ambient light levels decrease over time, the EL panel backlight levels increase correspondingly such that the illumination of the liquid-crystal display remains generally constant. The microcontroller 16 of FIG. 1 may utilize an 8-bit word to represent 256 steps of amplitude quantization of the relative light intensity levels, for example. The ambient light level may not necessarily decrease gradually over time but may exhibit a greater variance with time, in which case the EL panel backlight intensity may vary accordingly.

Figure 3:
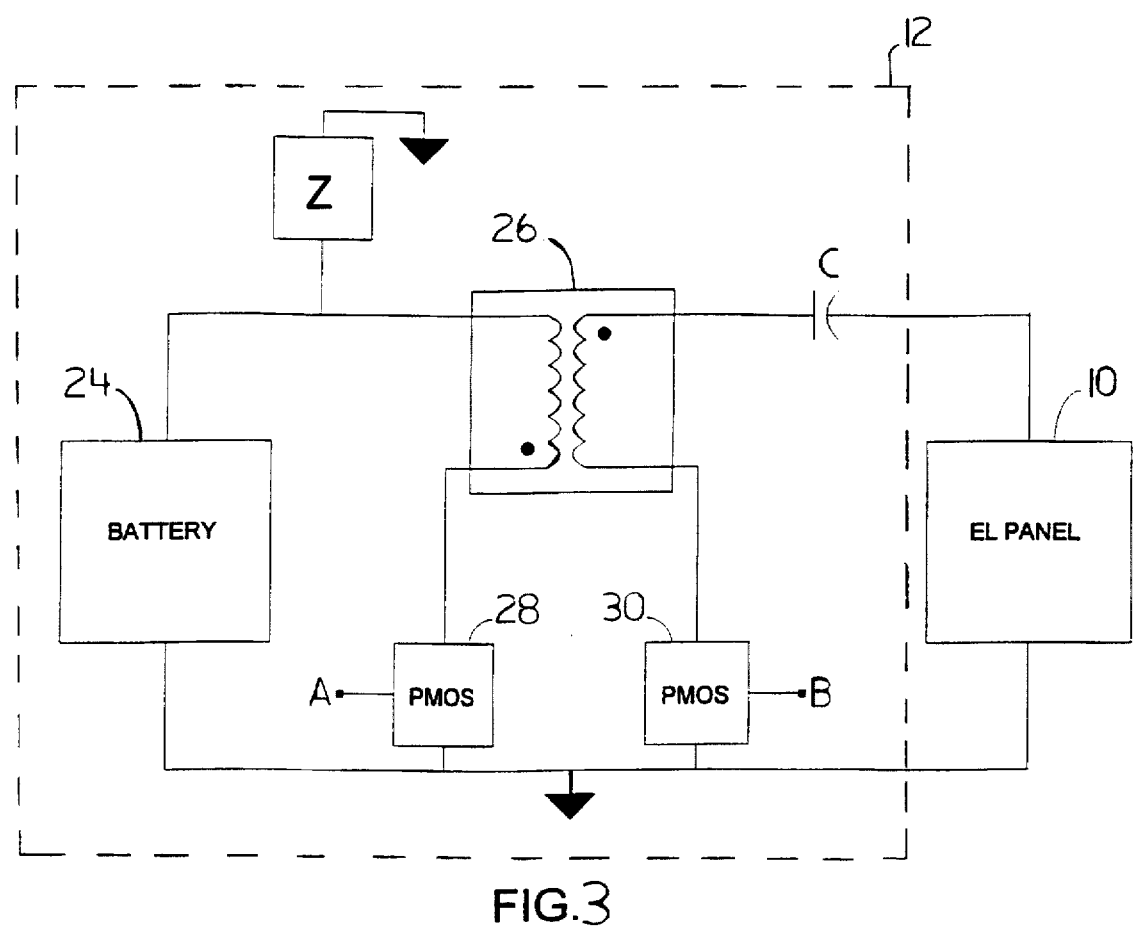
FIG. 3 illustrates an automatically adjustable electroluminescent backlight panel in conjunction with an efficient electroluminescent panel power supply unit.

FIG. 3 depicts an exemplary power supply unit 12 for the electroluminescent backlight panel 10 of the present invention. The power supply unit 12 may recover normally unused energy stored in the electroluminescent panel 10 to be restored into the main raw battery 24 whereby the main raw battery 24 is essentially charged with energy from the electroluminescent panel 10. The main raw battery 24 may supply the operating power of the portable electronic device in which the present invention is utilized. The output voltage of the battery 24 may drive a transformer 26 through which a stepped-up AC voltage is applied to the electroluminescent panel 10 through a coupling capacitor C. The battery 24 output voltage may be stabilized by a filter network Z. PMOS transistors 28 and 30 may be utilized to control the driving of the electroluminescent panel 10 with energy from battery 24 and to control the discharging of energy from the electroluminescent panel 10 into the battery 24 respectively. The PMOS driving inputs A and B may be controlled by the pulse-width modulator 14 of FIG. 1 which may be adapted to have two output signals, one connected to driving input A and one connected to driving input B for charging and discharging functions respectively.

The combination of automatic control of the output of the electroluminescent panel 10 of FIG. 1 and the efficient electroluminescent power supply unit 12 of FIG. 3 results in a reduction of the electrical energy consumed by the video display system. The reduction of electrical energy consumed by the display system will thereby increase the amount of operational time of a portable battery powered electronic device for a given battery charge cycle.

It will be apparent that many modifications and variations may be effected without departing from the teachings and concepts of the present disclosure.

What is claimed is:

1. An apparatus for automatically controlling the backlighting of a display, comprising:
   a backlight for providing a light output for backlighting the display;
   a first light detector disposed proximate to said backlight for detecting the light output of said backlight;
   a second light detector for detecting the level of ambient light;
   a controller operatively connected to said first and second light detectors, said controller for controlling the light output of said backlight based upon the detected light output of said backlight and the detected level of ambient light; and
   wherein the light output of said backlight is increased as the level of ambient light decreases and is decreased as the level of ambient light increases.

2. An apparatus as claimed in claim 1, wherein said controller varies the light output of said backlight for conserving battery energy when said backlight is battery powered.

3. An apparatus as claimed in claim 1, wherein said controller includes an analog-to-digital converter for digitizing the level of ambient light.

4. An apparatus as claimed in claim 1, wherein said controller includes an analog-to-digital converter for digitizing the light output provided by said backlight.

5. An apparatus as claimed in claim 1, wherein said controller includes a pulse-width modulator for modulating the light output of said backlight.

6. An apparatus as claimed in claim 1, wherein said backlight is an electroluminescent device.

7. An apparatus as claimed in claim 1, wherein said backlight is an electroluminescent panel.

8. A method for reducing the amount of energy consumed by a backlight for a video display system comprising the steps of:
   (a) converting battery energy to electroluminescent panel energy;
   (b) charging an electroluminescent panel with the electroluminescent panel energy such that a first portion of the electroluminescent panel energy is converted to light energy and a second portion of the electroluminescent panel energy is stored therein;
   (c) converting the stored electroluminescent panel energy into battery energy by discharging the electroluminescent panel; and
   (d) recharging a battery with the thus converted battery energy.

9. The method of claim 8 wherein the charging of the electroluminescent panel is controlled according to varying ambient light levels.

10. The method of claim 8 wherein the discharging of the electroluminescent panel is controlled according to varying ambient light levels.

11. The method of claim 8 wherein the charging of the electroluminescent panel is controlled according to varying ambient light levels and the electroluminescent panel output level.

12. The method of claim 8 wherein the discharging of the electroluminescent panel is controlled according to varying ambient light levels.

* * * * *